(12) United States Patent
Aizawa

(10) Patent No.: US 8,667,388 B2
(45) Date of Patent: Mar. 4, 2014

(54) WEB DOCUMENT STRUCTURE ANALYSIS AND CONDITIONAL ELEMENT SHIFTING AND INSERTION

(75) Inventor: Daigo Aizawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 187 days.

(21) Appl. No.: 13/399,318

(22) Filed: Feb. 17, 2012

(65) Prior Publication Data
US 2013/0061130 A1 Mar. 7, 2013

(30) Foreign Application Priority Data
Sep. 2, 2011 (JP) ................................. 2011-191588

(51) Int. Cl.
*G06F 17/00* (2006.01)

(52) U.S. Cl.
USPC ........................................................ 715/234

(58) Field of Classification Search
USPC ........................................................ 715/234
See application file for complete search history.

(56) References Cited

U.S. PATENT DOCUMENTS 6,014,680 A    1/2000 Sato et al.
7,747,633 B2 * 6/2010 Kadiyska et al. ............. 707/755
2003/0172196 A1 * 9/2003 Hejlsberg et al. ............. 709/328
2004/0010755 A1 * 1/2004 Hamada ......................... 715/513
2006/0036612 A1 * 2/2006 Harrop et al. ................. 707/100
2009/0187530 A1 * 7/2009 Nair et al. ......................... 707/1

FOREIGN PATENT DOCUMENTS

JP    9-69101 A    3/1997
JP    10-143513 A  5/1998

* cited by examiner

*Primary Examiner* — Doug Hutton, Jr.
*Assistant Examiner* — Andrew McIntosh
(74) *Attorney, Agent, or Firm* — Sughrue Mion, PLLC

(57) ABSTRACT

An information processing apparatus includes a selector unit that selects a character string, an element specifying unit that specifies a first element from among elements defined by a document structure definition controlling a document into which the selected character string is inserted, an insertion destination specifying unit that specifies an insertion destination within the document, and a shifting unit that determines whether the first element is able to have a character string as an element, searches the document structure definition for a second element that is lower than the first element and is able to have a character string, searches the document structure definition for an element to be inserted between the first element and the second element, generates an insertion element by interpolating between the first element and the second element with the element to be inserted, and shifts the insertion element to the insertion destination.

14 Claims, 17 Drawing Sheets

```
1  <?xml version="1.0" encoding="UTF-8" standalone="no"?>
2  <book xmlns="http://pppppppp.xxxxxxxxx.co.jp/sample">
3      <article>
4              <title></title>
5              <paragraph>
6                      <text>ABCDEKLMNO</text>
7                      <list>
8                              <li><text>FGHIJ</text></li>
9                      </list>
10             </paragraph>
11     </article>
12 </book>
```

```
1   <?xml version="1.0" encoding="UTF-8"?>
2   <xs:schema xmlns:xs="http://www.w3.org/2001/XMLSchema"
3       xmlns="http://pppppppp.xxxxxxxx.co.jp/sample"
4       targetNamespace="http://pppppppp.xxxxxxxx.co.jp/sample"
5       elementFormDefault="qualified">
6       <xs:element name="book">
7           <xs:complexType>
8               <xs:sequence>
9                   <xs:element ref="article" maxOccurs="unbounded"/>
10              </xs:sequence>
11          </xs:complexType>
12      </xs:element>
13      <xs:element name="article">
14          <xs:complexType>
15              <xs:sequence>
16                  <xs:element name="title" type="xs:string"/>
17                  <xs:element name="subtitle" type="xs:string" minOccurs="0" />
18                  <xs:element ref="paragraph" minOccurs="0" maxOccurs="unbounded"/>
19              </xs:sequence>
20          </xs:complexType>
21      </xs:element>
22      <xs:element name="paragraph">
23          <xs:complexType>
24              <xs:sequence>
25                  <xs:element ref="text" minOccurs="0" maxOccurs="unbounded"/>
26                  <xs:element ref="list" minOccurs="0" maxOccurs="unbounded"/>
27              </xs:sequence>
28          </xs:complexType>
29      </xs:element>
30      <xs:element name="list">
31          <xs:complexType>
32              <xs:sequence>
33                  <xs:element ref="li" maxOccurs="unbounded"/>
34              </xs:sequence>
35          </xs:complexType>
36      </xs:element>
37      <xs:element name="li">
38          <xs:complexType>
39              <xs:sequence>
40                  <xs:element name="text" type="xs:string"/>
41              </xs:sequence>
42          </xs:complexType>
43      </xs:element>
44      <xs:element name="text" type="xs:string"/>
45  </xs:schema>
```

FIG. 4
```
1  <?xml version="1.0" encoding="UTF-8" standalone="no"?>
2  <book xmlns="http://ppppppp.xxxxxxxx.co.jp/sample">
3      <article>
4          <title>TITLE</title>
5          <paragraph>
6              <text> ABCDEFGHIJKLMNO </text>
7          </paragraph>
8      </article>
9  </book>
```
FIG. 5
TITLE
 

FIG. 8

```
1  <?xml version="1.0" encoding="UTF-8" standalone="no"?>
2  <book xmlns="http://pppppppp.xxxxxxxx.co.jp/sample">
3      <article>
4          <title>TITLE</title>
5          <paragraph>
6              <text> ABCDEKLMNO </text>
7              <list>
8                  <li><text>FGHIJ</text></li>
9              </list>
10         </paragraph>
11     </article>
12 </book>
```

FIG. 9

```
1  <?xml version="1.0" encoding="UTF-8" standalone="no"?>
2  <book xmlns="http://pppppppp.xxxxxxxx.co.jp/sample">
3      <article>
4          <title>TITLE</title>
5          <paragraph>
6              <text> ABCDEFGHIJKLMNO</text>
7          </paragraph>
8      </article>
9  </book>
```

TITLE

ABCDEKLMNO — 1210

(1)FGHIJ — 1220

```
1  <?xml version="1.0" encoding="UTF-8" standalone="no"?>
2  <book xmlns="http://pppppppp.xxxxxxxxx.co.jp/sample">
3      <article>
4          <title>TITLE</title>
5          <paragraph>
6              <text>ABCDEKLMNO</text>
7              <list>
8                  <li><text>FGHIJ</text></li>
9              </list>
10         </paragraph>
11     </article>
12 </book>
```

1 | ABCDE <list><li><text> FGHIJ </text></li></list> KLMNO

```
1  ABCDE
2  <?xml version="1.0" encoding="UTF-8" standalone="no"?>
3  <book xmlns="http://pppppppp.xxxxxxxxx.co.jp/sample">
4      <article>
5          <paragraph>
6              <list>
7                  <li><text>FGHIJ</text></li>
8              </list>
9          </paragraph>
10     </article>
11 </book>
12 KLMNO
```

FIG. 18

```
1  ABCDE
2  <?xml version="1.0" encoding="UTF-8" standalone="no"?>
3  <book xmlns="http://pppppppp.xxxxxxxx.co.jp/sample">
4      <article>
5              <title></title>
6              <paragraph>
7                      <list>
8                                      <li><text> FGHIJ</text></li>
9                      </list>
10             </paragraph>
11     </article>
12 </book>
13 KLMNO
```

FIG. 19

```
1  ABCDEKLMNO
2  <?xml version="1.0" encoding="UTF-8" standalone="no"?>
3  <book xmlns="http://pppppppp.xxxxxxxx.co.jp/sample">
4      <article>
5              <title></title>
6              <paragraph>
7                      <list>
8                                      <li><text> FGHIJ</text></li>
9                      </list>
10             </paragraph>
11     </article>
12 </book>
```

FIG. 20

```
1  <text> ABCDEKLMNO </text>
2  <?xml version="1.0" encoding="UTF-8" standalone="no"?>
3  <book xmlns="http://pppppppp.xxxxxxxx.co.jp/sample">
4      <article>
5                  <title></title>
6                  <paragraph>
7                          <list>
8                                      <li><text>FGHIJ </text></li>
9                          </list>
10                 </paragraph>
11     </article>
12 </book>
```

FIG. 21

```
1  <?xml version="1.0" encoding="UTF-8" standalone="no"?>
2  <book xmlns="http://pppppppp.xxxxxxxx.co.jp/sample">
3      <article>
4                  <title></title>
5                  <paragraph>
6                          <text>ABCDEKLMNO </text>
7                          <list>
8                                      <li><text>FGHIJ </text></li>
9                          </list>
10                 </paragraph>
11     </article>
12 </book>
```

US 8,667,388 B2

WEB DOCUMENT STRUCTURE ANALYSIS AND CONDITIONAL ELEMENT SHIFTING AND INSERTION

CROSS-REFERENCE TO RELATED APPLICATIONS

This application is based on and claims priority under 35 USC 119 from Japanese Patent Application No. 2011-191588 filed Sep. 2, 2011.

BACKGROUND

Technical Field

The present invention relates to an information processing apparatus, an information processing method, and a non-transitory computer readable medium.

SUMMARY

According to an aspect of the invention, there is provided an information processing apparatus. The information processing apparatus includes a selector unit that selects a character string, an element specifying unit that specifies, with respect to the character string selected by the selector unit, a first element from among elements defined by a document structure definition controlling a document into which the character string selected by the selector unit is inserted, an insertion destination specifying unit that specifies within the document an insertion destination as a position in which the character string selected by the selector unit is to be inserted, and a shifting unit that determines in accordance with the document structure definition whether the first element specified by the element specifying unit is able to have a character string as an element, searches the document structure definition for a second element that is lower than the first element and is able to have a character string as an element if the shifting unit has determined that the first element is not able to have a character string as an element, generates the second element having the character string selected by the selector unit, searches the document structure definition for an element to be inserted between the first element and the second element, generates an insertion element by interpolating between the first element and the second element the element to be inserted, and shifts the insertion element to the insertion destination specified by the insertion destination specifying unit.

BRIEF DESCRIPTION OF THE DRAWINGS

Exemplary embodiment of the present invention will be described in detail based on the following figures, wherein:

FIG. 3 illustrates an example of schema;
FIG. 4 illustrates an example of a structured document;
FIG. 5 illustrates a display example of a document;
FIG. 8 illustrates an example a structured document subsequent to editing;
FIG. 9 illustrates an example of the structured document;
FIG. 18 illustrates an example of the structured document (under process);
FIG. 19 illustrates an example of the structured document (under process);
FIG. 20 illustrates an example of the structured document (under process);
FIG. 21 illustrates an example a structured document subsequent to editing.

DETAILED DESCRIPTION

One exemplary embodiment of the present invention is described below with reference to the drawings.

Figure 1:
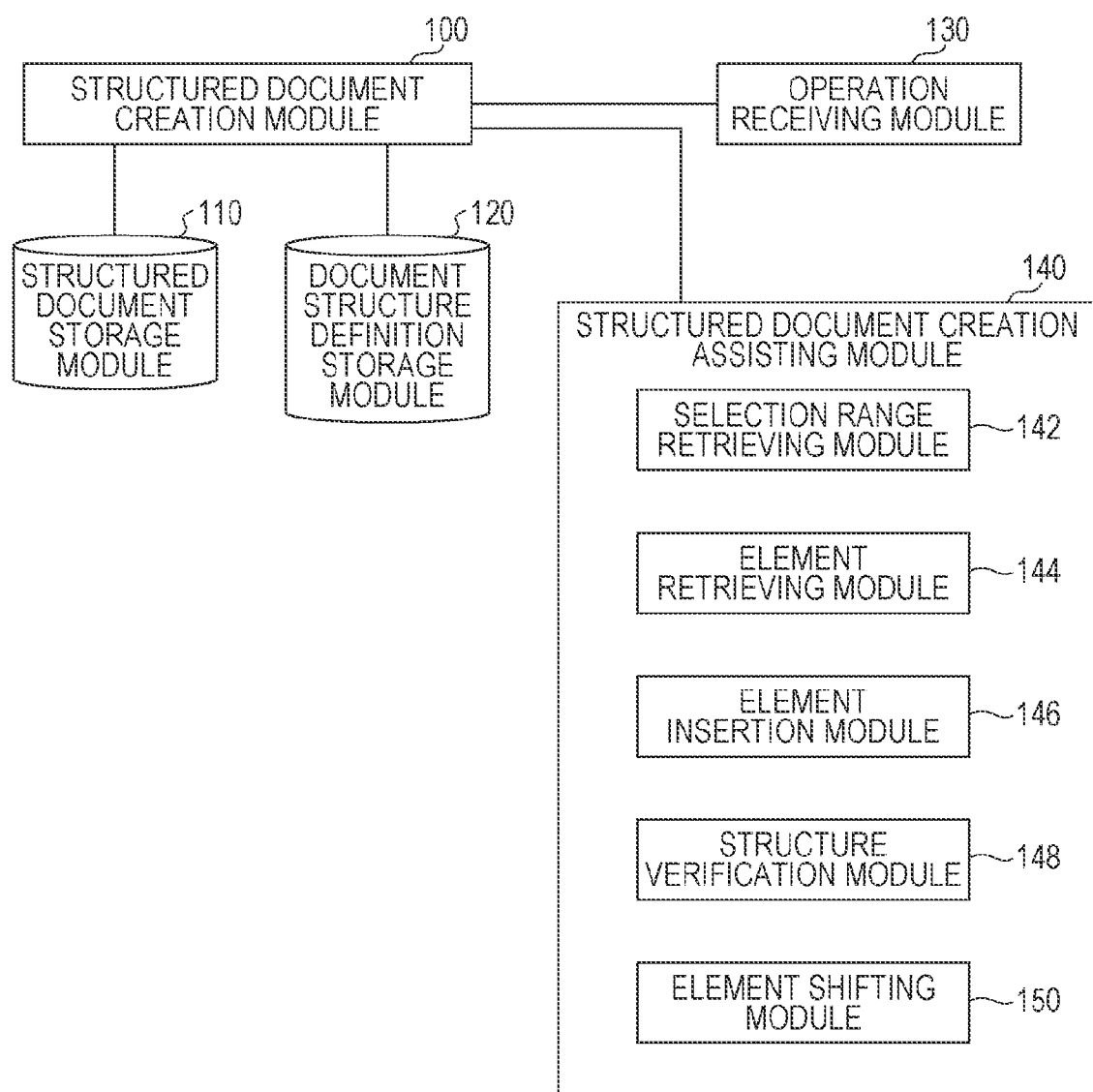
FIG. 1 illustrates a module configuration of an exemplary embodiment of the present invention.

FIG. 1 illustrates a configuration of modules of the exemplary embodiment.

The word module refers to a software component that is logically separable (a computer program), or a hardware component. The module of the exemplary embodiment refers to not only a module in a computer program but also a module in a hardware structure. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In a software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, a "connection" refers to not only a physical connection but also a logical connection (such as an exchange of data, instructions, and data reference relationship). The word "predetermined" means that something is decided in advance of a process of interest. The word "predetermined" is thus intended to refer to something that is decided in advance of a process of interest in the exemplary embodiment. Even after a process in the exemplary embodiment has started, the word "predetermined" refers to something that is decided in advance of a process of interest depending on a condition or a status of the exemplary embodiment at the present point of time or depending on a condition or status heretofore continuing down to the present point of time. A statement that reads "If A, B is performed" is used to convey the meaning that it is determined whether condition A is satisfied, and that if the condition A is satisfied, B is performed. This statement is not applicable if the determination as to whether the condition A is satisfied or not is unnecessary.

The word "system" and the word "apparatus" refer to an arrangement where multiple computers, a hardware structure, and an apparatus are interconnected via a communication network (including a one-to-one communication connection). The word "system" and the word "apparatus" also refer to an arrangement that includes a single computer, a hardware structure, or an apparatus. The word "system" and the word "apparatus" have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description of the reading of the information from the memory device prior to the process and the writing of the processed information onto the memory device subsequent to the process may be omitted as appropriate. The memory devices may include a hard disc, a random access memory (RAM), an external storage medium, a memory device connected via a communication line, and a register within a central processing unit (CPU).

An information processing apparatus of the exemplary embodiment inserts into a document an element specifying a selected character string. As illustrated in FIG. 1, the information processing apparatus includes structured document creation module 100, structured document storage module 110, document structure definition storage module 120, operation retrieving module 130, and structured document creation assisting module 140.

The exemplary embodiment is the information processing apparatus that edits or creates a structured document such as extensible markup language (XML).

A structured document creation editor (a document creation apparatus) handling a structured document is described first.

The structured document creation editor displays a structured document in a style sheet that is specification information of a display format. A display region of the style sheet (hereinafter referred to as a style display region) is typically presented in the same display format as the display format of a standard editor.

The style display region is in the same display format as the standard editor. It is a common practice that a range having a character string in the style display region is prevented from being selected and then copied/pasted. This is because a range selected by an operator does not necessarily agree with a document structure. According to the exemplary embodiment, an element is specified in a character string and the selected character string is copied/pasted (inserted).

The structured document creation module 100 is connected to the structured document storage module 110, the document structure definition storage module 120, the operation retrieving module 130, and the structured document creation assisting module 140. The structured document creation module 100 applies the style sheet to a structured document stored on the structured document storage module 110, and displays the structured document on the style display region of a display screen of a display device. The style sheet is stored on a storage device accessible by the structured document creation module 100. The style sheet is stored on the structured document storage module 110, for example. When the operation retrieving module 130 receives an operation of an operator, the structured document creation module 100 performs an edit process responsive to the operation. If the operation selects a range as an edit target in the structured document, the structured document creation module 100 causes the structured document creation assisting module 140 to retrieve the selected range as the edit target. The structured document creation module 100 specifies an element in the selected character string, and copies/pastes (inserts) the character string. The documents to be handled include the structured document and a document of plain text that is not a structured document. The plain text is composed of only character codes of text, and does not include a tag and the like typically used in the structured document.

The structured document storage module 110 is connected to the structured document creation module 100, and stores the structured document and the plain-text document. In response to an access from the structured document creation module 100, the structured document storage module 110 passes the structured document and the plain-text document to the structured document creation module 100. Specific structured documents and the plain-text documents are described below with reference to a structured document 400 and the like illustrated in FIG. 4 and other drawings, and with reference to a display document 1400 and the like illustrated in FIG. 14 and other drawings. The structured document storage module 110 may store the style sheet.

The document structure definition storage module 120 is connected to the structured document creation module 100, and stores a document structure definition (hereinafter also referred to as schema) corresponding to the structured document. In response to an access by the structured document creation module 100, the document structure definition storage module 120 passes a schema to the structured document creation module 100. The schema defines a structure of the structured document, and is described using one of the schema languages including document type definition (DTD), XML schema, and RELAX. The schema is specifically described below with reference a schema 300 of FIG. 3. The structured document complies with the corresponding schema. The plain-text document has also a schema corresponding thereto. According to the exemplary embodiment, the structured document creation module 100 creates a structured document from a plain-text document in accordance with the corresponding schema.

The operation retrieving module 130 is connected to the structured document creation module 100. The operation retrieving module 130 receives an operation of the operator who operates a keyboard, a mouse, a touchpanel, and the like, and then passes the operation to the structured document creation module 100. The operation is applicable to the structured document and the plain-text document displayed in a display region of document (the style display region, for example). The operations include a selection operation selecting a range of an edit target to the displayed structured document and the displayed plain-text document. When the operation specifies the selection of the range as the edit target in the structured document and the plain-text document, the operation retrieving module 130 passes the range to the structured document creation assisting module 140 via the structured document creation module 100.

If the range selection as the edit target, i.e., the character string selection is followed by specifying an element to the character string, the operation retrieving module 130 passes the element to the structured document creation assisting module 140 via the structured document creation module 100. The element passed to the structured document creation assisting module 140 is an element specified in the operation of the operator (hereinafter referred to as a first element) from among the elements defined by the schema controlling the document (the structured document or the plain-text document) into which the character string is inserted. In the schema 300 of FIG. 3, for example, an element candidate that may be specified is displayed between a pair of quotation marks (") of element name=" ". More specifically, the schema 300 includes "book," "article," "title," "subtitle," "paragraph," "text," "list," and "li" displayed as elements. In response to the operation of the operator, the elements are specified. The word "specified" means that a selected character string is specified as an element.

When the character string is selected, followed by an operation to insert the character string, the operation retrieving module 130 passes an insertion destination as a position within the document to the structured document creation module 100 via the structured document creation module 100. The operation to insert the character string may not necessarily be expressly stated. The selection of the character string and the specification of the element may directly be the insertion operation of the character string. The insertion destination may be specified by a character position expressed by a count of characters present prior to a character of interest, or may be specified by a character string. The actual insertion position may not necessarily be a specified insertion position. The character string may be inserted into a position that accommodates the character string in accordance with the schema. The insertion operation is described in detail below with reference to a process of the structured document creation assisting module 140.

If the element specified by the operation of the operator has a plurality of lower elements thereunder, the operation retrieving module 130 selectively displays the lower element. The lower element, if specified by the operation of the operator, may be set to be the first element (specified element). The operation is described in detail with reference to FIGS. 25 and 26.

The structured document creation assisting module 140 includes selection range retrieving module 142, element retrieving module 144, element insertion module 146, structure verification module 148, and element shifting module 150. The structured document creation assisting module 140 is connected to the structured document creation module 100.

The selection range retrieving module 142 retrieves a start position and an end position of the range selected by the operation of the operator received by the operation retrieving module 130, with respect to the structured document and the plain-text document displayed on the display region of the display device by the structured document creation module 100. The selection range retrieving module 142 then retrieves the character string enclosed by the start position and the end position.

The element retrieving module 144 retrieves the first element specified with respect to the character string retrieved by the selection range retrieving module 142.

The element insertion module 146 retrieves as the position within the document the insertion destination into which the character string retrieved by the selection range retrieving module 142 is inserted.

The element shifting module 150 determines in accordance with the definition of the schema whether the first element retrieved by the element retrieving module 144 is able to have a character string as an element. If the element shifting module 150 determines that the first element is not able to have a character string as an element, the element shifting module 150 searches the schema for a second element that is lower than the first element and is able to have a character string as an element. The element shifting module 150 generates the second element having the character string retrieved by the selection range retrieving module 142. For example, a character string "FGHIJ" may be selected, and "list" as an element (first element) of the character string may be specified. In the schema 300 of FIG. 3, "list" is not immediately followed by any character string. The element shifting module 150 thus searches the schema 300 for a lower element "text" (second element) under the element "list" and generates the element "text" having the character string "FGHIJ." In other words, the element shifting module 150 generates "<text> FGHIJ </text>."

If the element shifting module 150 determines that the first element retrieved by the element retrieving module 144 is able to have a character string as an element, the element shifting module 150 determines that the first element is an insertion element. For example, if "text" (first element) is specified as an element of the character string in the above example, the first element "text" may be followed by a character string in the schema 300 of FIG. 3. The element shifting module 150 generates the element "text" having the character string "FGHIJ." In other words, the element shifting module 150 generates "<text> FGHIJ </text>."

The element shifting module 150 searches the schema 300 for an element to be inserted between the first element and the second element, and interpolates the element between the first element and the second element. The element shifting module 150 thus generates an insertion element, and shifts the insertion element to the insertion destination retrieved by the element insertion module 146. In the above example, for example, the element to be inserted between the first element "list" and the second element "text" is "li" in the schema 300. The element shifting module 150 thus interpolates "li" between "list" and "text," thereby generating the insertion element. More specifically, the element shifting module 150 generates the insertion element "<list> <li> <text> FGHIJ </text> </li> </list>. The insertion element is then shifted to the insertion destination.

When the element shifting module 150 searches the schema 300 for an element to be inserted between the first element and the second element, no elements may be present. In other words, if the document structure definition permits the first element to be right below the second element, the second element is directly the insertion element. For example, the first element may be "li," and the second element may be "text." In such a case, no element is needed between "li" and "text," and the element shifting module 150 generates the insertion element "<li> <text> FGHIJ </text> </li>.

The structure verification module 148 determines whether the shifting of the insertion element by the element shifting module 150 to the insertion destination retrieved by the element insertion module 146 violates the definition in the schema 300. The determination as to whether the shifting of the insertion element violates the definition in the schema 300 may be performed depending on whether the element preset at the insertion destination retrieved by the structured document creation assisting module 140 is able to have the insertion element in accordance with the definition in the schema 300. For example, if the element at the insertion destination is "text," the element "text" is not able to have the insertion element "<list> <li> <text> FGHIJ </text> </li> </list>.

If the structure verification module 148 determines that the shifting of the insertion element violates the definition in the schema 300, the element shifting module 150 ahead of or behind the position of the insertion destination for a position that accommodates the insertion element, and inserts the insertion element to the position that accommodates the insertion element. In the above example, the element shifting module 150 searches ahead of or behind the position of the insertion destination for a position that accommodates "<list> <li> <text> FGHIJ </text> </li> </list>. If such a position is found, the element shifting module 150 inserts the insertion element at the position.

If the search results indicate that no position accommodating the insertion element is found ahead of or behind the position of the insertion destination, the element shifting module 150 searches the schema 300 for an upper element above the insertion element, and then generates as a new insertion element the upper element having the second element.

The structure verification module 148 determines whether the shifting of the insertion element by the element shifting module 150 (the insertion element including the upper element of the second element) to the insertion destination retrieved by the element insertion module 146 violates the definition in the schema 300. The insertion process of the element shifting module 150 and the determination process of the structure verification module 148 are then repeated thereafter.

If the position accommodating the insertion element is not found, an indication that the insertion element is not able to be inserted is presented. For example, an error indication is displayed on the display device.

Figure 2:
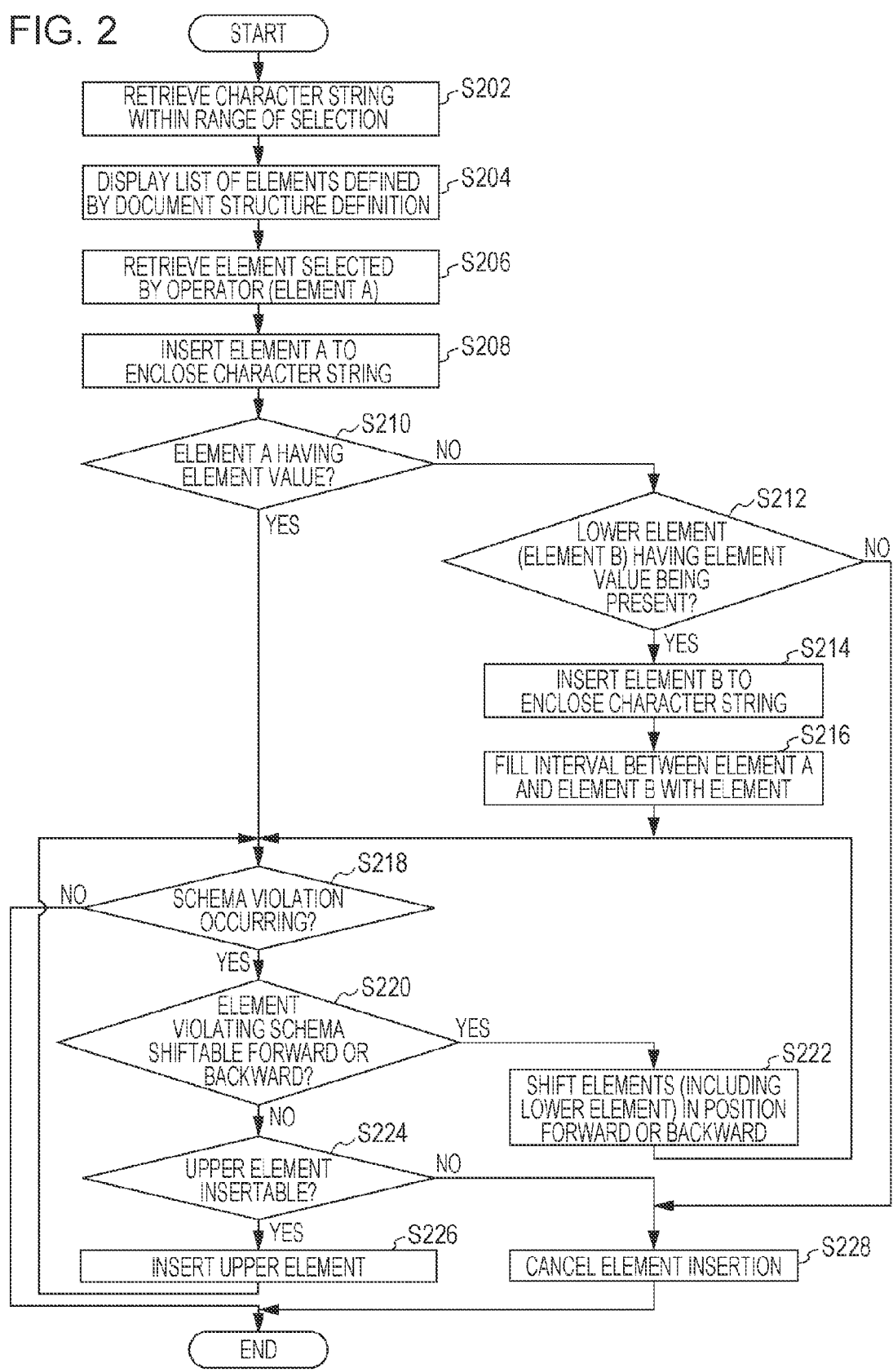
FIG. 2 is a flowchart illustrating a process example of the exemplary embodiment.

FIG. 2 is a flowchart illustrating a process of the exemplary embodiment.

The process is generally performed in response to an operation of the operator. A character string is selected from the structured document or the plain-text document, a structure that is to be inserted is selected, and a position receiving the structure (in the following example, a position of a character string selected) is selected. According to the exemplary embodiment, the character string selected by the operator is recognized by an element value, and an element to be inserted between the inserted element and the element value is inserted in accordance with the schema 300. Structuring complying with the schema structure is thus assisted. The element is shifted in a manner such that the inserted element does not violate the schema 300.

In step S202, the selection range retrieving module 142 retrieves a character string within a range of selection. In other words, the selection range retrieving module 142 retrieves the character string within the range selected by the operation of the operator.

In step S204, the operation retrieving module 130 displays a list of elements defined by the document structure definition (schema).

In step S206, the element retrieving module 144 retrieves the element selected by the operator (here element A corresponding to the first element described above). The element insertion module 146 retrieves a position (insertion position) at which the character string retrieved in step S202 is to be inserted.

In step S208, the element shifting module 150 inserts the element A in a manner such that the element A encloses the character string. The phrase "enclose the character string" means that the character string is sandwiched between <element name> and </element name>.

In step S210, the element shifting module 150 determines whether the element A is able to have an element value as a character string. If the element A is able to have an element value, processing proceeds to step S218; otherwise, processing proceeds to step S212.

In step S212, the element shifting module 150 determines whether a lower element (element B) is present below the element A able to have an element value as a character string. If a lower element is present below the element A, processing proceeds to step S214; otherwise, processing proceeds to step S228.

In step S214, the element shifting module 150 inserts the element B in a manner such that the character string is enclosed by the element B.

In step S216, the element shifting module 150 fills the interval between the element A and the element B with the element. Processing proceeds to step S218.

In step S218, the structure verification module 148 determines whether the shifting violates the schema. If the shifting violates the schema, processing proceeds to step S220; otherwise, processing ends.

The element shifting module 150 determines in step S220 whether the element violating the schema 300 is shiftable ahead of or behind the insertion destination. If the element violating the schema 300 is not shiftable, processing proceeds to step S224; otherwise, processing proceeds to step S222.

In step S222, the element shifting module 150 shifts the elements (including the lower element) in position ahead of or behind, and then returns to step S218.

In step S224, the element shifting module 150 determines whether the upper element is insertable. If the upper element is insertable, processing proceeds to step S226; otherwise, processing proceeds to step S228.

In step S226, the element shifting module 150 inserts the upper element, and then returns to step S218.

In step S228, the structured document creation assisting module 140 cancels the insertion operation of the element. Processing thus ends.

The examples of the exemplary embodiment are described below.

Example 1

FIG. 3 illustrates an example of the schema stored on the document structure definition storage module 120. As illustrated in FIG. 3, the schema 300 defines elements including "book," "article," "title," "subtitle," "text," and "paragraph." The relationship between these elements is also defined. For example, the following relationship is learned by analyzing the schema 300. An element below the element "book" is "article" (see line 6 through line 9 in the schema 300). Elements below the element "article" are "title," "subtitle," and "paragraph" (see line 13 through line 18 in the schema 300). Elements below the element "paragraph" are "text," and "list" (see line 22 through line 26 in the schema 300). An element below the element "list" is "lit" (see line 30 through line 33 in the schema 300). An element below the element "lit" is "text" (see line 37 through line 40 in the schema 300). The element is enclosed by the pair of quotation marks (") of element name=" " as described above. The relationship of the upper position between the elements and the lower position between the elements may be learned by tracing a relation "element ref."

The analysis of the schema 300 also clarifies that the elements able to accommodate a character string include "title," "subtitle," and "text" (see lines 16, 17, and 40 in the schema 300). This determination as to whether the element is able to accommodate a character string is performed based on whether the definition of the element includes "type="xs: string."

A structured document stored on the structured document storage module 110 is illustrated in FIG. 4. FIG. 4 illustrates an example of a structure document 400. The structured document 400 includes an element "title" including a character string "TITLE," an element "text" including a character string "ABCDEFGHIJKLMNO," and an element "paragraph." The structured document 400 is controlled by the schema 300.

The structured document creation module 100 may apply the style sheet to the structured document 400 to display a display document 500 in the style display region. FIG. 5 illustrates the display document 500. A character string 510 is displayed in the display document 500.

Figure 6:
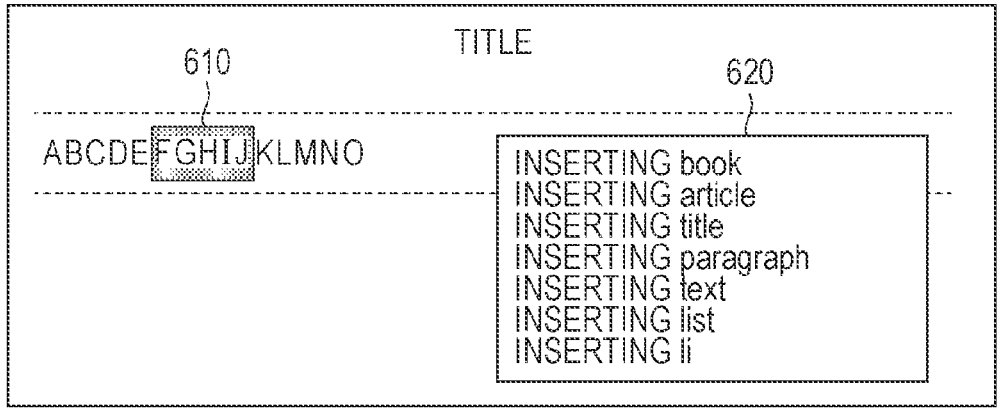
FIG. 6 illustrates a document with a menu displayed thereon.

FIG. 6 illustrates a display example where a menu 620 is displayed on a display document 600. An element insertion command may be executed with a selection range 610 selected by the operation of the operator in the display document 600. (The element insertion command is to attach an element to a selected character string, and to insert the element into the position of the selected character sting). The menu 620 is displayed. In the menu 620, elements are collected from within the schema 300 and then displayed. The operator may now select "inserting list."

Figure 7:
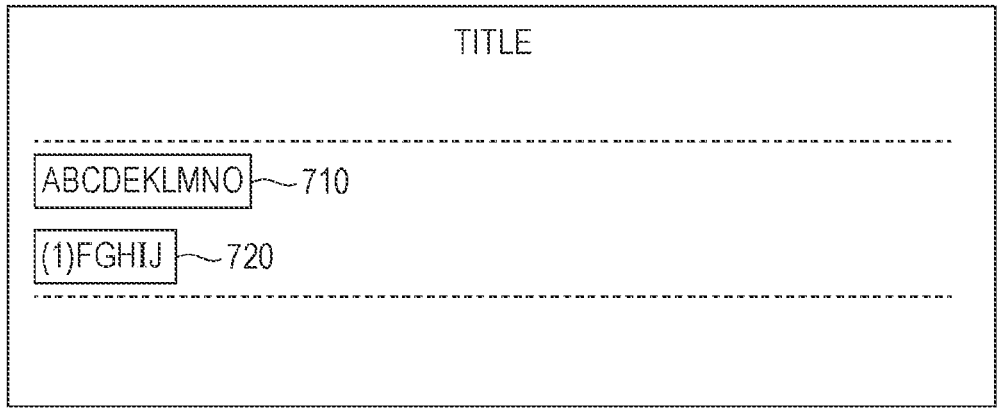
FIG. 7 illustrates an example of a displayed document subsequent to editing.

FIG. 7 illustrates an example of a display document 700 after being edited. A character string 720 (character string "FGHIJ") is displayed as an element "list" different from the display document 500 illustrated in FIG. 5. The character string 510 (character string "ABCDEFGHIJKLMNO") is modified to be a character string 710 (character string "ABCDEKLMNO") by shifting a character string 610 (character string "FGHIJ").

FIG. 8 illustrates an example of a structured document 800 after being edited. The structured document 400 of FIG. 4 is modified in a manner such that <list> <li> <text> FGHIJ </text> </li> </list> is inserted subsequent to <text> ABCDEKLMNO </text>.

The above process is summarized below.
1-1) The character string selected by the selection operation of the operator is inserted into the list element. More specifically, "<list> FGHIJ </list>" is generated (step S208).
1-2) Since the definition of the schema 300 does not allow the list element to have an element value as a character string, the "text" element able to accommodate an element value is selected from among lower elements below the list element. More specifically, the element shifting module 150 generates a structure of "<list> <text> FGHIJ </text> </list> (step S214).
1-3) The li element is interpolated between the text element and the list element. More specifically, the element shifting module 150 generates a structure of <list> <li> <text> FGHIJ </text> </li> </list> (step S216). According to the definition of the schema 300, the list element has only the li element, and is not able to accommodate the text element therebelow. The li element is thus interpolated.
1-4) The definition of the schema 300 does not allow the structure of <list> <li> <text> FGHIJ </text> </li> </list> to be present at the position (lower than the text element) as the destination where the original "FGHIJ" has been present (yes branch from step S218). The element shifting module 150 searches for a position behind the text element (searching in the determination operation in step S220).
1-5) Since the definition of the schema 300 allows the structure to be inserted below the text element, the element shifting module 150 shifts the structure accordingly (step S222). No schema violation occurs in this state (no branch from step S218), and processing ends.

Example 2

An example 2 relates to a structured document 900 serving as an edit target as described below. FIG. 9 illustrates the structured document 900. The structured document 900 is stored on the structured document storage module 110. A schema corresponding to the structured document 900 is the schema 300.

Figure 10:
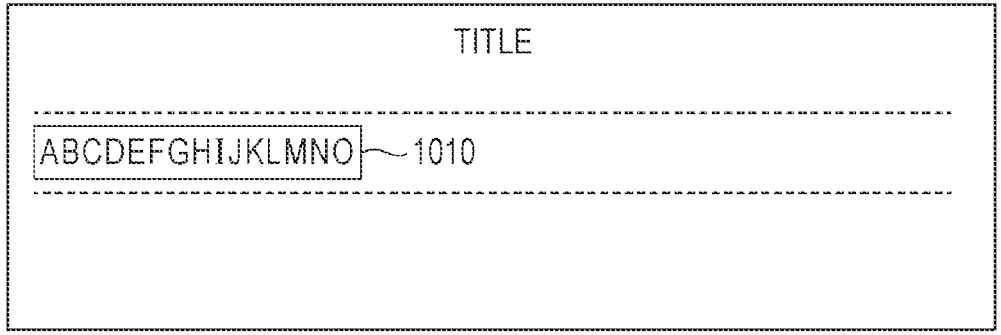
FIG. 10 illustrates a display example of a document.

The structured document creation module 100 may apply the style sheet to the structured document 900 to display a display document 1000 in the style display region. FIG. 10 illustrates the display document 1000. A character string 1010 is displayed in the display document 1000.

Figure 11:
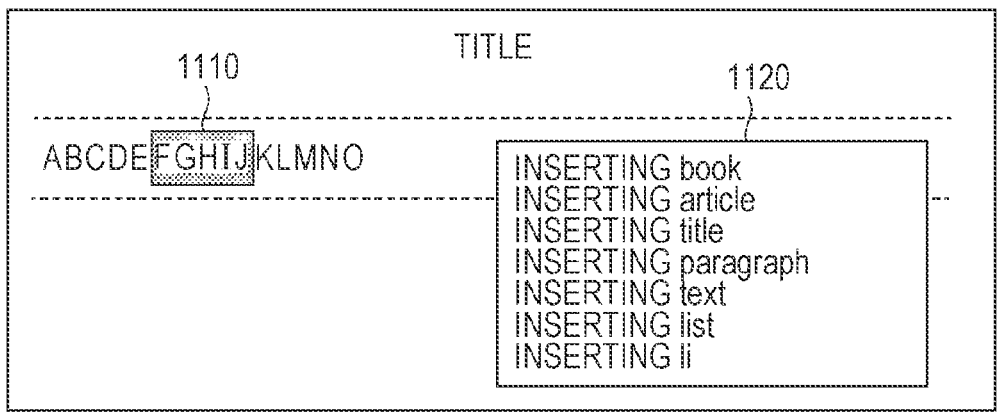
FIG. 11 illustrates a document with a menu displayed thereon.

FIG. 11 illustrates a menu 1120 displayed on a display document 1100. An element insertion command may be executed with a selection range 1110 selected by the operation of the operator in the display document 1100. The menu 1120 is displayed. In the menu 1120, elements are collected from within the schema 300 and then displayed. The operator may now select "inserting li."

Figures 12, 13:
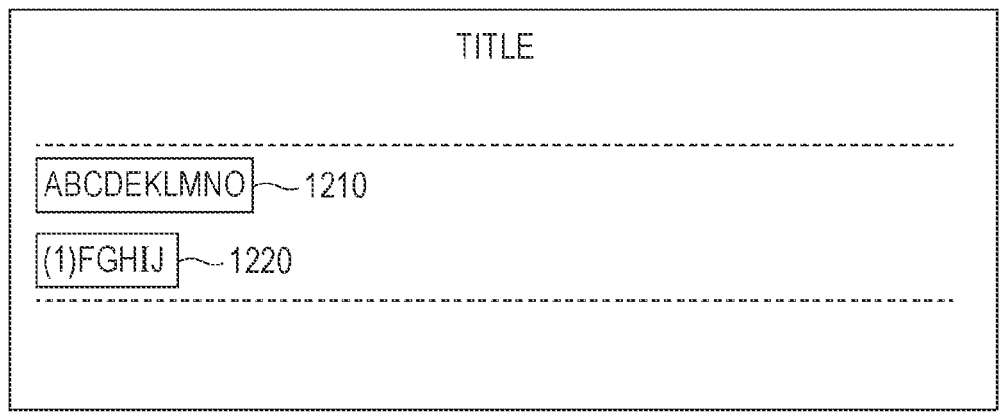
FIG. 12 illustrates an example of a displayed document subsequent to editing.
FIG. 13 illustrates an example a structured document subsequent to editing.

FIG. 12 illustrates an example of a display document 1200 after being edited. The state illustrated in FIG. 10 is modified in a manner such that a character string 1220 (character string "FGHIJ") is displayed as an element "li." The character string 1010 (character string "ABCDEFGHIJKLMNO") is modified to be a character string 1210 (character string "ABCDEKLMNO") by shifting the character string 1110 (character string "FGHIJ").

FIG. 13 illustrates an example of a structured document 1300 after being edited. The structured document 900 of FIG. 9 is modified in a manner such that <list> <li> <text> FGHIJ </text> </li> </list> is inserted subsequent to <text> ABCDEKLMNO </text>.

The above process is summarized below.
2-1) The character string selected by the selection operation of the operator is inserted into the li element. More specifically, "<li> FGHIJ </li>" is generated (step S208).
2-2) Since the definition of the schema 300 does not allow the li element to have an element value as a character string, the "text" element able to accommodate an element value is selected for insertion from among lower elements below the li element. More specifically, the element shifting module 150 generates a structure of "<li> <text> FGHIJ </text> </li> (step S214).
2-3) An element needed between the text element and the li element is interpolated. No element is needed, in practice (a needed element (no element in practice) is interpolated). More specifically, the structure of <li> <text> FGHIJ </text> </li> remains untouched (step S216).
2-4) The definition of the schema 300 does not allow the structure of <li> <text> FGHIJ </text> </li> to be present at the position (lower than the text element) as the destination where the original "FGHIJ" has been present (yes branch from step S218). The element shifting module 150 searches for a position behind the text element (searching in the determination operation in step S220).

2-5) Since the definition of the schema 300 indicates that no position is available behind the text element, the element shifting module 150 searches for a position ahead of the text element (searching in the determination operation in step S220).

2-6) No position is available ahead of the text element (no branch from step S220). The definition of the schema 300 allows an upper element of the li element (the list element here) to be inserted (yes branch from step S224). The list element as an upper element of the li element is thus inserted. The element shifting module 150 generates <list> <li> <text> FGHIJ </text> </li> </list> (step S226).

2-7) The definition of the schema 300 does not allow the structure of <list> <li> <text> FGHIJ </text> </li> </list> to be present at the position (lower than the text element) as the destination where the original "FGHIJ" has been present (yes branch from step S218). The element shifting module 150 searches behind the text element for a position that accommodates the insertion (searching in the determination operation in step S220).

2-8) Since the definition of the schema 300 allows the structure to be inserted below the text element, the element shifting module 150 shifts the structure accordingly (step S222). No schema violation occurs in this state (no branch from step S218), and processing ends.

Example 3

Figure 14:
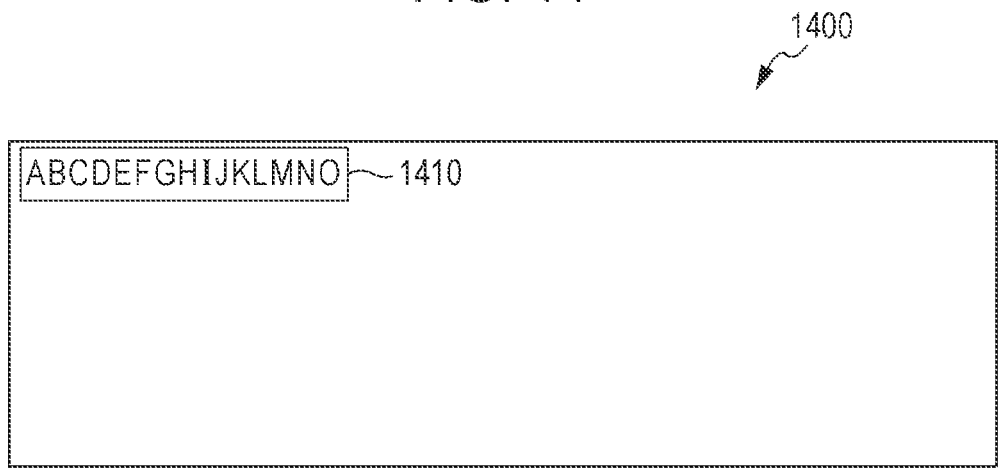
FIG. 14 illustrates a display example of a document.

An example 3 relates to a plain text document serving as an edit target as described below. The structured document creation module 100 displays a display document 1400 as a plain text document in a document display region. FIG. 14 illustrates an example of the structured document 1400. A character string 1410 is displayed within the display document 1400. The content of the plain text document is identical to the content of the display document 1400. The plain text document is stored on the structured document storage module 110, and a schema corresponding to the structured document 1400 is the schema 300.

Figure 15:
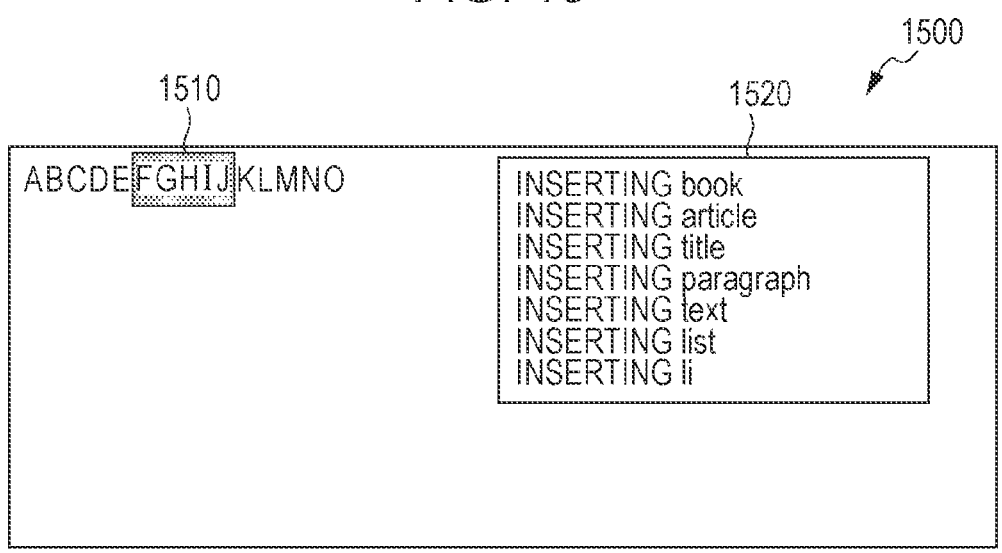
FIG. 15 illustrates a document with a menu displayed thereon.

FIG. 15 illustrates a menu 1520 displayed on a display document 1500. An element insertion command may be executed with a selection range 1510 selected by the operation of the operator in the display document 1500. The menu 1520 is displayed. In the menu 1520, elements are collected from within the schema 300 and then displayed. The operator may now select "inserting list."

3-1) The character string selected by a selection operation of the operator is inserted into the list element. More specifically, "<list> FGHIJ </list>" is generated (step S208).

3-2) Since the definition of the schema 300 does not allow the list element to have an element value as a character string, the text element able to accommodate an element value is selected from among lower elements below the list element. More specifically, the element shifting module 150 generates a structure of "<list> <text> FGHIJ </text> </list> (step S214).

3-3) The li element is interpolated between the text element and the list element. More specifically, the element shifting module 150 generates a structure of <list> <li> <text> FGHIJ </text> </li> </list> (step S216). According to the definition of the schema 300, the list element has only the li element, and is not able to accommodate the text element right therebelow. The li element is thus interpolated.

Figure 16:
FIG. 16 illustrates an example of the structured document (under process)

FIG. 16 illustrates a structured document (under process) in the above state. The character string "FGHIJ" is structured.

Figure 17:
FIG. 17 illustrates an example of the structured document (under process)

3-4) The definition of the schema 300 does not allow the structure of <list> <li> <text> FGHIJ </text> </li> </list> to be present at the position as the destination where the original "FGHIJ" has been present (yes branch from step S218). No position that accommodates the insertion is available behind the text element (no branch from step S220). An upper element may be interpolated (yes branch from step S224). An upper structure is inserted (step S226). Thus interpolated are the paragraph element above the list element (referring to the list element on line 26 in the schema 300), the article element (referring to the paragraph element on line 18 in the schema 300), and the book element (referring to the article element on line 9 in the schema 300). More specifically, a structured document 1700 (under process) results as illustrated in FIG. 17.

3-5) Since there is no title element that is essential below the article element according to the definition of the schema 300, a title element is inserted (step S226). Line 17 in the schema 300 reads minOccurs="0", the subtitle element is not an essential element. More specifically, a structured document 1800 (under process) results as illustrated in FIG. 18.

3-6) Since the definition of the schema 300 does not allow the structure below the book element to be present at the current position (yes branch from step S218), the element shifting module 150 searches for a position that accommodates the insertion behind the text element (searching in the determination operation in step S220). The definition of the schema 300 allows the structure below the book element to be present behind "KLMNO" (to be present if not within the character string). The structure below the book element is shifted behind "KLMNO" (step S222). More specifically, a structured document 1900 (under process) results as illustrated in FIG. 19.

3-7) The character string "ABCDEKLMNO" is not structured (yes branch from step S218, no branch from step S220, and yes branch from step S224). The character string "ABCDEKLMNO" is thus structured (step S226). An element having an element value as a character string out of elements defined by the schema 300 is inserted. According to the definition of the schema 300, the text element is an element having an element value, and the text element is thus inserted. More specifically, a structured document 2000 (under process) results as illustrated in FIG. 20.

3-8) According to the definition of the schema 300, a structure <text> ABCDEKLMNO </text> is not allowed to be present ahead of the book element (yes branch from step S218). The element shifting module 150 searches for a position accommodating the sentence behind the book element (searching in the determination operation in step S220). The definition of the schema 300 allows the structure to be present above the list element and the structure is moved (step S222). As search results indicate, this position is where the text element is first insertable. In this state, schema violation does not occur (no branch from step S218). More specifically, a structured document 2100 results as illustrated in FIG. 21.

Figure 22:
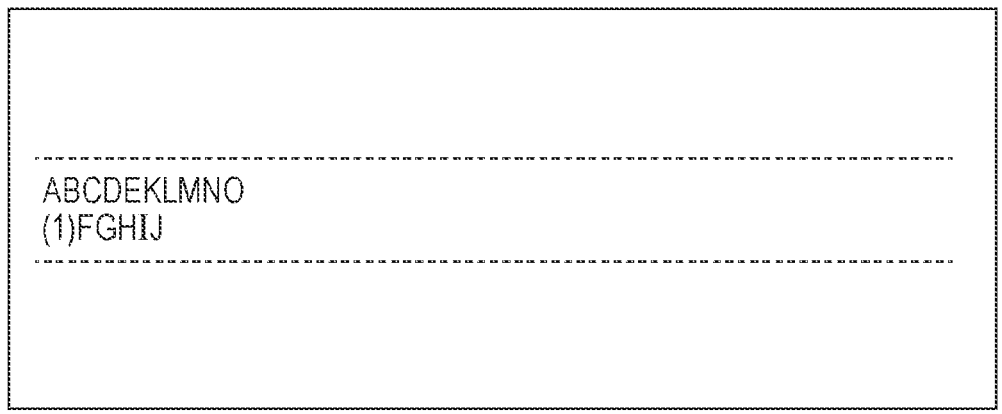
FIG. 22 illustrates an example of a displayed document subsequent to editing.

FIG. 22 illustrates a display document 2200 after being edited. The structured document creation module 100 may apply the style sheet to the structured document 2100 to display a display document 2200 in the style display region.

Example 4

Figure 23:
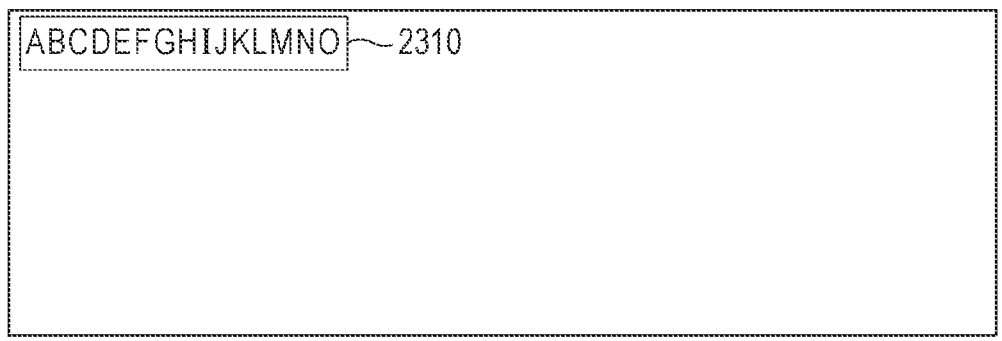
FIG. 23 illustrates a display example of a document.

An example 4 relates to a plain text document serving as an edit target as described below. The structured document creation module 100 displays a display document 2300 as a plain text document in a document display region. FIG. 23 illustrates the structured document 2300. A character string 2310 is displayed within the display document 2300. The content of the plain text document is identical to the content of the display document 2300. The plain text document is stored on the structured document storage module 110, and a schema corresponding to the structured document 1400 is the schema 300.

Figure 24:
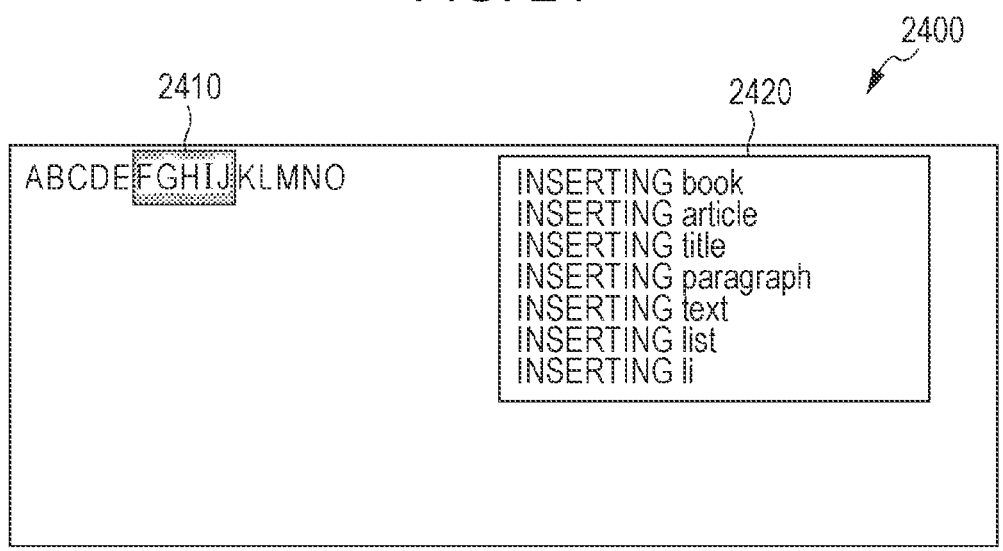
FIG. 24 illustrates a document with a menu displayed thereon.

FIG. 24 illustrates a menu 2420 displayed on a display document 2400. An element insertion command may be executed with a selection range 2410 selected by the operation of the operator in the display document 2400. The menu 2420 is displayed. In the menu 2420, elements are collected from within the schema 300 and then displayed.

4-1) The operator may now select "inserting article."

Four insertable structures are available. In the flowchart of FIG. 2, multiples lower elements are present below the element A specified in step S208 in the schema 300.

```
(a) <book> <article> <title> FGHIJ </title> </article>
<book>
(b) <book> <article> <paragraph> <text> FGHIJ </text>
</paragraph> </article> </book>
(c) <book> <article> <subtitle> FGHIJ </subtitle> </article>
</book>
(d) <book> <article> <paragraph> <list> <li> <text> FGHIJ
</text> </li> </list> </paragraph> </article> </book>
```

Figure 25:
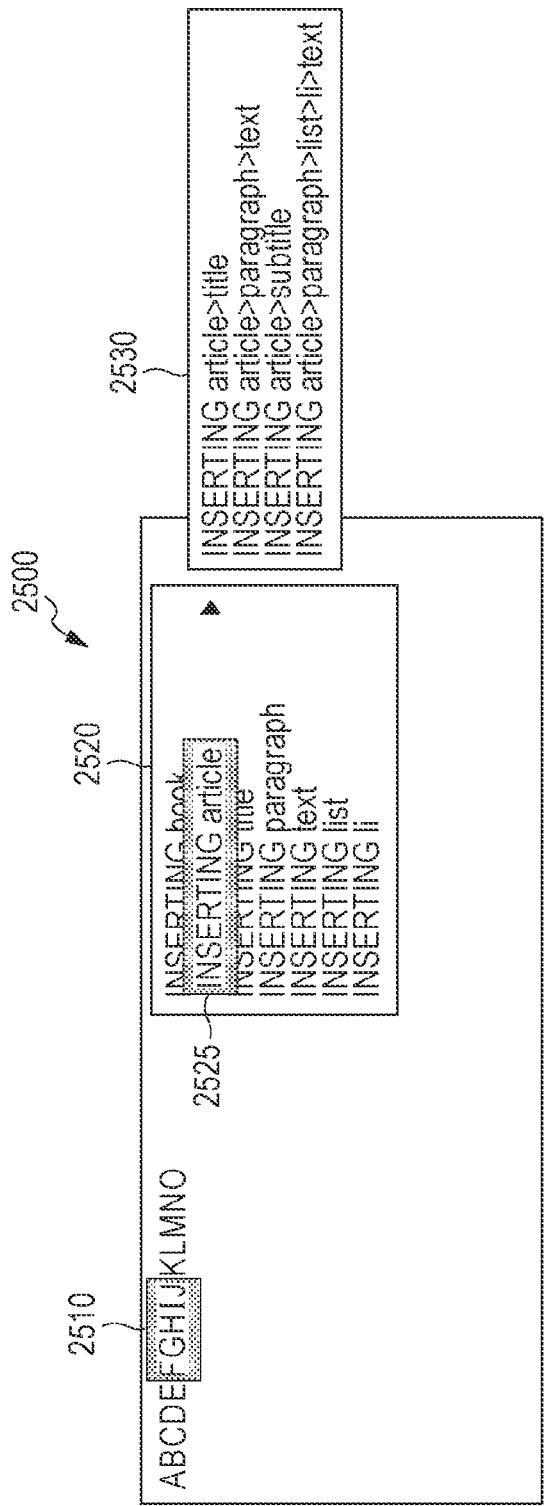
FIG. 25 illustrates a document with a menu displayed thereon.

If multiple elements are present below the element A, the operator may select a desired structure. To this end, an even lower menu 2530 is displayed such that a structure selected by the operator is inserted as illustrated in FIG. 25. FIG. 25 illustrates a menu 2520 and a menu 2530 displayed on a display document 2500. If a menu 2525 (inserting article) is selected from within the menu 2520 by the operation of the operator, the menu 2530 is displayed.

Figure 26:
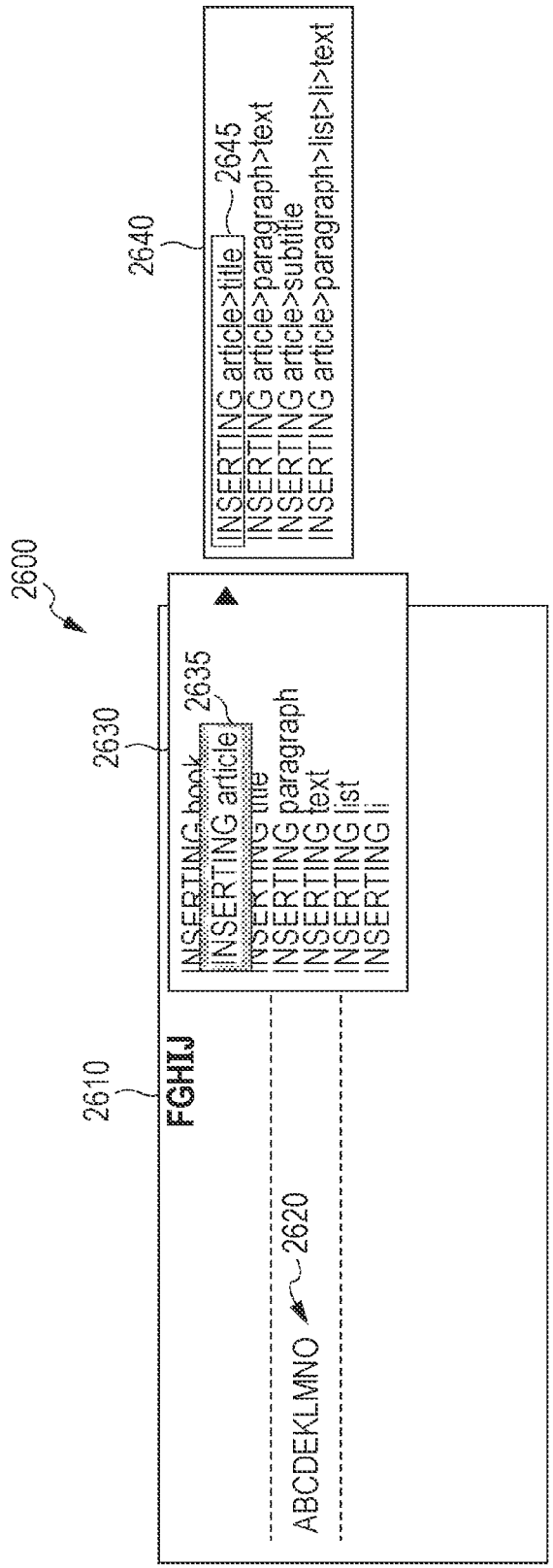
FIG. 26 illustrates a document with a menu displayed thereon.

4-2) If a structure within a menu 2640 is selected by an operation of the operator, a preview illustrating how a structure (screen display) becomes in response to an actual insertion may be displayed as illustrated in FIG. 26. For example, if a selection menu 2645 (inserting article>title) is selected, a preview may be displayed as illustrated in FIG. 26. As illustrated in FIG. 26, a menu 2630 and a menu 3640 are displayed on a display document 2600, and the selection menu 2645 (inserting article >title) is selected. More specifically, "FGHIJ" is displayed as the title element. The above process may lead to this displaying. However, the above process is performed for preview purposes. The above process is a tentative process that is still to be finalized, and does not store the edit result on the document structure definition storage module 120 as a structured document. If the selection of the structure within the menu 2640 is complete (for example, if a structure within the menu 2640 is clicked), the edit result is stored on the document structure definition storage module 120. If the element candidate in the structure of the display document 2600 is single, a similar preview operation may be performed.

Figure 27:
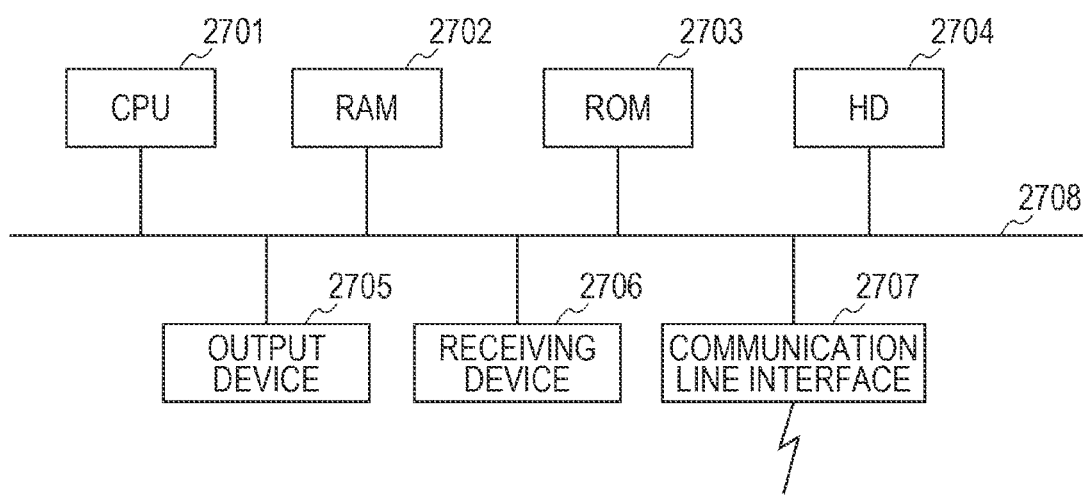
FIG. 27 is a block diagram illustrating a hardware configuration of a computer implementing the exemplary embodiment.

The computer of the exemplary embodiment executing the program has a hardware configuration of a typical computer as illustrated in FIG. 27. More specifically, the computer is a personal computer or a computer serving as a server. More specifically, the computer includes a central processing unit (CPU) 2701 as a processor, and random-access memory (RAM) 2702, read-only memory (ROM) 2703, and hard disc (HD) 2704 as storage devices. The CPU 2701 executes the programs. The programs to be executed by the CPU 2701 include the structured document creation module 100, the operation retrieving module 130, the structured document creation assisting module 140, the selection range retrieving module 142, the element retrieving module 144, the element insertion module 146, the structure verification module 148, and the element shifting module 150. The computer thus includes the RAM 2702 storing the data and the programs, the ROM 2703 storing a program starting the computer, and the HD 2704 as an auxiliary memory device. The computer further includes a receiving device 2706 receiving data in response to an operation performed on a keyboard, a mouse, or a touchpanel by a user, an image output device 2705 such as a cathode ray tube (CRT) or a liquid-crystal display (LCD), a communication line interface 2707 such as a network interface card for connection with a communication network, and a bus 2708 interconnecting these elements for data exchange. Multiple computers may be connected via a network.

The software computer program as the exemplary embodiment may be read onto a hardware structure system and then executed with the hardware structure system in cooperation with software resources. The hardware configuration of FIG. 27 is illustrated for exemplary purposes only. The exemplary embodiment is not limited to the configuration of FIG. 27. Any structure is acceptable as long as the structure implements the modules described with reference to the exemplary embodiment. For example, one of the modules may be constructed of a particular hardware structure (such as application specific integrated circuit (ASIC)). One of the modules may belong to an external system and may be connected to the system of the exemplary embodiment via a communication line. Multiple systems, each illustrated in FIG. 27, may be interconnected via a communication line such that the systems operate in concert with each other. The system may be incorporated in each of the personal computer, digital home appliance, photocopier, facsimile machine, scanner, printer, complex machine (serving at least two of the scanner, the printer, the photocopier, and the facsimile machine).

According to the exemplary embodiment, the element shifting module 150 searches for a position behind the text element as a position where the element can be present before searching for a position ahead the text element. Alternatively, a position ahead of the text element may be searched for. According to the exemplary embodiment, the position found first in the searching is set to be an insertion position. Alternatively, ranges ahead of and behind the text element may be searched. If the two ranges have respective positions where the element can be present, one of the positions whichever offers a shorter distance of shifting may be selected as the insertion position.

The process content of each module may employ the technique discussed with reference to the related art.

The above-described program may be supplied in a stored state on a recording medium. The program may also be provided via a communication network. In such a case, the above-described program may be understood as an invention of a "computer readable recording medium storing the program."

The "computer readable recording medium storing the program" refers to a computer readable recording medium storing the program, and used to install the program, to execute the program, or to distribute the program.

The recording media include digital versatile disc (DVD), compact disc (CD), Blu-ray disc (registered trademark), magnetooptical disc (MO), flexible disc (FD), magnetic tape, hard disc, read-only memory (ROM), electronically erasable and programmable read-only memory (EEPROM (registered trademark)), flash memory, random-access memory (RAM), and secure digital (SD) memory. The DVDs include "DVD-R, DVD-RW, and DVD-RAM" complying with the standard formulated by the DVD forum, and "DVD+R and DVD+RW"

complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired networks include a local-area network (LAN), a metropolitan-area network (MAN), a wide-area network (WAN), the Internet, an intranet, and an extranet. The program in whole or in part may be transmitted over a carrier wave.

The program may be part of another program, or may be stored on the recording medium together with another program. The program may be split and split programs may then be stored on the recording medium. The program may be processed in any fashion before being stored as long as the program remains restorable. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing method comprising:
    selecting a character string;
    specifying, with respect to the selected character string, a first element from among elements defined by a document structure definition controlling a document into which the selected character string is inserted;
    specifying within the document an insertion destination as a position in which the selected character string is to be inserted; and
    determining in accordance with the document structure definition whether the specified first element is able to have a character string as an element, searching the document structure definition for a second element that is lower than the first element and is able to have a character string as an element if the first element is not able to have a character string as an element, generating the second element having the selected character string, searching the document structure definition for an element to be inserted between the first element and the second element, generating an insertion element by interpolating between the first element and the second element the element to be inserted, and shifting the insertion element to the specified insertion destination.

2. A non-transitory computer readable medium storing a program causing a computer to execute a process for processing information, the process comprising:
    selecting a character string;
    specifying, with respect to the selected character string, a first element from among elements defined by a document structure definition controlling a document into which the selected character string is inserted;
    specifying within the document an insertion destination as a position in which the selected character string is to be inserted; and
    determining in accordance with the document structure definition whether the specified first element is able to have a character string as an element, searching the document structure definition for a second element that is lower than the first element and is able to have a character string as an element if the first element is not able to have a character string as an element, generating the second element having the selected character string, searching the document structure definition for an element to be inserted between the first element and the second element, generating an insertion element by interpolating between the first element and the second element the element to be inserted, and shifting the insertion element to the specified insertion destination.

3. An information processing apparatus comprising:
    a selector unit that selects a character string;
    an element specifying unit that specifies, with respect to the character string selected by the selector unit, a first element from among elements defined by a document structure definition controlling a document into which the character string is inserted;
    an insertion destination specifying unit that specifies within the document an insertion destination as a position in which the character string selected by the selector unit is to be inserted; and
    a shifting unit that determines in accordance with the document structure definition whether the first element specified by the element specifying unit is able to have a character string as an element, searches the document structure definition for a second element that is lower than the first element and is able to have a character string as an element if the shifting unit has determined that the first element is not able to have a character string as an element, generates the second element having the character string selected by the selector unit, searches the document structure definition for an element to be inserted between the first element and the second element, generates an insertion element by interpolating between the first element and the second element the element to be inserted, and shifts the insertion element to the insertion destination specified by the insertion destination specifying unit.

4. The information processing apparatus according to claim 3, further comprising a violation determination unit that determines whether the shifting of the insertion element by the shifting unit to the insertion destination specified by the insertion destination specifying unit violates the document structure definition,
    wherein if the violation determination unit determines that the shifting violates the document structure definition, the shifting unit searches ahead of or behind the position of the insertion destination for a position that accommodates the insertion element, and inserts the insertion element to the position that accommodates the insertion element.

5. The information processing apparatus according to claim 4, wherein if the search results indicate that a position that accommodates the insertion element is not available ahead of or behind the position of the insertion destination, the shifting unit searches the document structure definition for an upper element of the insertion element, and generates as a new insertion element the upper element having the second element, and
    wherein the violation determination unit determines whether the shifting of the insertion element by the shifting unit to the insertion destination specified by the insertion destination specifying unit violates the document structure definition.

6. The information processing apparatus according to claim 3, wherein the document includes one of a structured document and a plain text document that is not a structured document.

7. The information processing apparatus according to claim 4, wherein the document includes one of a structured document and a plain text document that is not a structured document.

8. The information processing apparatus according to claim 5, wherein the document includes one of a structured document and a plain text document that is not a structured document.

9. The information processing apparatus according to claim 3, wherein if an element is specified through an operation of an operator, and has a plurality of lower elements, the element specifying unit displays selectively the lower element, and sets the lower element specified through the operation of the operator to be the first element.

10. The information processing apparatus according to claim 4, wherein if an element is specified through an operation of an operator, and has a plurality of lower elements, the element specifying unit displays selectively the lower element, and sets the lower element specified through the operation of the operator to be the first element.

11. The information processing apparatus according to claim 5, wherein if an element is specified through an operation of an operator, and has a plurality of lower elements, the element specifying unit displays selectively the lower element, and sets the lower element specified through the operation of the operator to be the first element.

12. The information processing apparatus according to claim 6, wherein if an element is specified through an operation of an operator, and has a plurality of lower elements, the element specifying unit displays selectively the lower element, and sets the lower element specified through the operation of the operator to be the first element.

13. The information processing apparatus according to claim 7, wherein if an element is specified through an operation of an operator, and has a plurality of lower elements, the element specifying unit displays selectively the lower element, and sets the lower element specified through the operation of the operator to be the first element.

14. The information processing apparatus according to claim 8, wherein if an element is specified through an operation of an operator, and has a plurality of lower elements, the element specifying unit displays selectively the lower element, and sets the lower element specified through the operation of the operator to be the first element.

* * * * *